(12) United States Patent
Breckenridge

(10) Patent No.: US 6,186,297 B1
(45) Date of Patent: Feb. 13, 2001

(54) CONTROLLABLE TORQUE TRANSMISSION DEVICE

(75) Inventor: William J. Breckenridge, La Habra, CA (US)

(73) Assignee: Industrial Dynamics Company, Ltd., Torrance, CA (US)

(*) Notice: Under 35 U.S.C. 154(b), the term of this patent shall be extended for 0 days.

(21) Appl. No.: 09/419,071

(22) Filed: Oct. 15, 1999

(51) Int. Cl.$^7$ .................................................. F16D 67/04
(52) U.S. Cl. .................. 192/18 A; 192/52.6; 192/56.33; 464/36
(58) Field of Search ..................... 192/18 A, 52.3, 192/52.6, 85 A, 109 F, 107 C, 109 A, 14, 56.33; 464/36, 38

(56) References Cited

U.S. PATENT DOCUMENTS

| | | | |
|---|---|---|---|
| 2,683,362 | * 7/1954 | Bowman | 464/36 |
| 3,166,167 | * 1/1965 | Kinsman | 192/18 A |
| 3,174,350 | * 3/1965 | Harnish et al. | 192/18 A X |
| 3,509,974 | * 5/1970 | Kampert et al. | 192/52.3 X |
| 3,556,272 | * 1/1971 | Jones | 192/18 A |
| 4,286,441 | * 9/1981 | Scheneman et al. | 464/36 |

* cited by examiner

Primary Examiner—Rodney H. Bonck
(74) Attorney, Agent, or Firm—Irving Keschwer

(57) ABSTRACT

A controllable bidirectional torque limiting device for driving a machine element. The input shaft is connected to a driver and the output shaft is connected to the machine element. The clutch mode of operation provides an adjustably limited torque output which rotates the machine element; the braking mode of operation provides an adjustable braking torque capable of stopping the rotating machine element upon cessation of the torque transmission. The assembly provides driving or braking actions as required. The device comprises a rotor, circular brake pad and two spaced apart pistons. Compressed air is introduced through a port in the bearing housing and is entrapped inside the piston cylinder walls. The resultant pressure exerts a force on the piston, causing the rotor to be pressed against the brake disc in the braking mode of operation, the amount of air pressure controlling the braking force. A plurality of steel balls are positioned between a pair of discs made of resilient material. In the clutch, or torque transfer, mode of operation the rotor compresses the balls between the two discs, causing resistance to the ball rolling. The torque input is transferred to the output side; if the air pressure is varied, the amount of indentation will vary, thus controlling the output torque.

17 Claims, 4 Drawing Sheets

CONTROLLABLE TORQUE TRANSMISSION DEVICE

BACKGROUND OF INVENTION

1. Field of Invention

A bi-directional, variable torque output clutch utilizing a ring of spherical members compressed between layers of resilient material.

2. Description of the Prior Art

Conventional clutch devices operate on the principle of sliding friction and consists of a pair of friction discs arranged axially wherein one friction disc is attached to the device input shaft and the opposing friction disc is attached to the output shaft. Various techniques are used to provide a force which presses the two friction discs together. Energization of the driver (motor) results in an angular torque output which is limited by numerous factors including the applied force, coefficient of friction of the discs, etc. In these prior art designs, static-dynamic friction transitions occur, an undesirable characteristic. This is the primary cause for devices which operate on the sliding friction principle tend to skip and chatter and cause uneven start-up operation. Further, sliding friction type devices tend to wear faster than devices based on the concept of rolling friction. A prior art device which improves upon the conventional clutch devices utilizes magnetic particles, such as the model no. CB35DF3, manufactured by Force Limited, Santa Monica, Calif. In this device, clutching and braking functions are provided by the magnetic particles.

Systems in which the magnetic particle clutch device is utilized tend to have problems wherein rapid, braking forces are required. For example, in container inspection systems wherein containers are moved along a conveyor belt and wherein the containers are visually examined to ascertain if the containers are filled, damaged, etc. occasions have arisen wherein the bottles are stopped but the clutch drive is still engaged which causes excessive heat build up inside the clutch. If the condition is sustained for a long time period, the magnetic particles tend to fuse together, effectively damaging the clutch to the point wherein it has to be replaced. The magnetic particle based clutch is also relatively expensive.

In addition, most prior art clutch devices having output torque limiting features typically have one operating torque value. Those devices which provide adjustable torque capabilities tend to be cumbersome, expensive and unreliable.

SUMMARY OF THE PRESENT INVENTION

The present invention provides a bidirectional controllable torque transmission device which drives a machine element with an adjustable torque limiting capability. The input shaft is connected to a driver and the output shaft is connected to the machine element. The clutch mode of operation provides an adjustably limited torque output value causing rotation of the machine element; the braking mode of operation provides an adjustable braking torque capable of stopping the rotating machine element upon cessation of the torque transmission. The assembly provides either driving or braking actions as required. In a preferred mode, the device of the present invention is used to drive a container inspection conveyor line.

The brake portion of the device consists of a rotor, circular brake pad and two pistons arranged 180 degrees apart (additional pistons can be used as long as they are equidistant about the assembly axis). Compressed air is introduced into the bearing housing through a port and is entrapped inside the cylinder walls. The resultant pressure exerts a force on the pistons, causing the rotor to be pressed against the brake disc, thus stopping the rotation of the output shaft. In the clutch portion of the present invention, a plurality of balls are positioned between a pair of discs made of resilient deformable material, such as urethane. The rotor compresses the balls between the two discs when air pressure is introduced into the system, causing resistance to the rolling action of the balls. The torque input is thus transferred to the output side; if the pressure is varied, the amount of indentation will vary, the output torque thus changing accordingly and thereby providing a simple and convenient technique for adjusting the output torque. The braking mode of operation is similar in that varying the air pressure varies the braking torque. Both braking and torque transmission modes of operation cease when air pressure is no longer applied to the system.

The present invention thus provides an improved clutch assembly that provides smooth starts and chatter free slippage at a reduced cost and wherein the wear associated with conventional clutch assemblies is significantly reduced.

DESCRIPTION OF THE DRAWING

For a better understanding of the invention as well as other objects and further features thereof, reference is made to the following description which is to be read in conjunction with the accompanying drawings herein.

DESCRIPTION OF THE INVENTION

Figure 1:
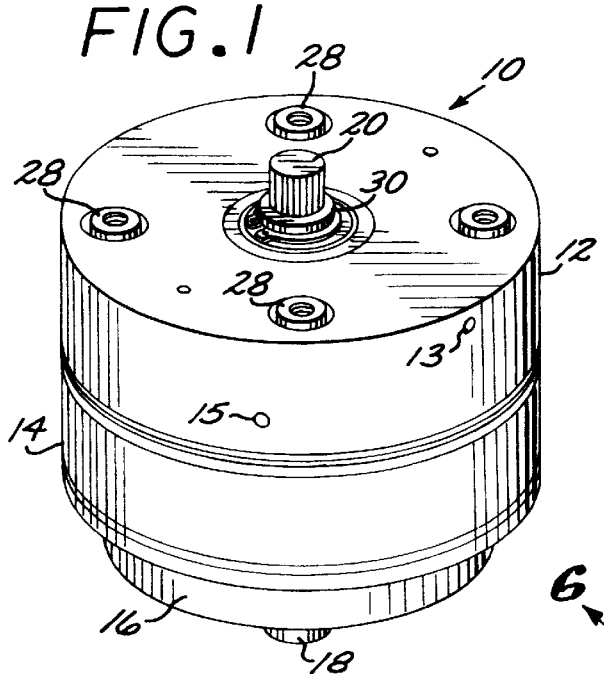
FIG. 1 is a perspective view of the torque limiting power transmission device of the present invention.
Figure 2:
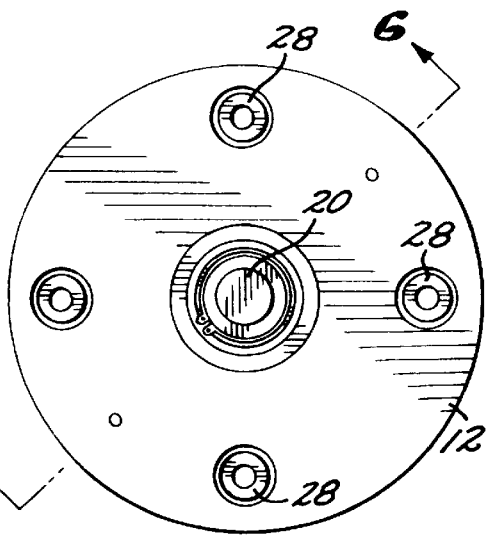
FIG. 2 is a top plan view of the device shown in FIG. 1.
Figure 3:
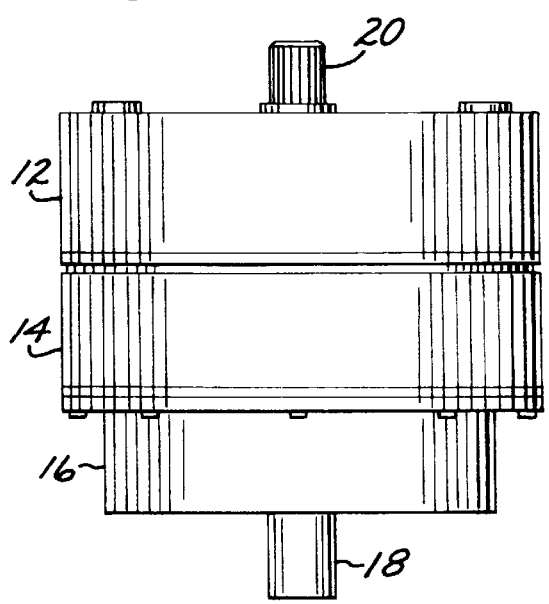
FIG. 3 is a side plan view of the device shown in FIG. 1.
Figure 4:
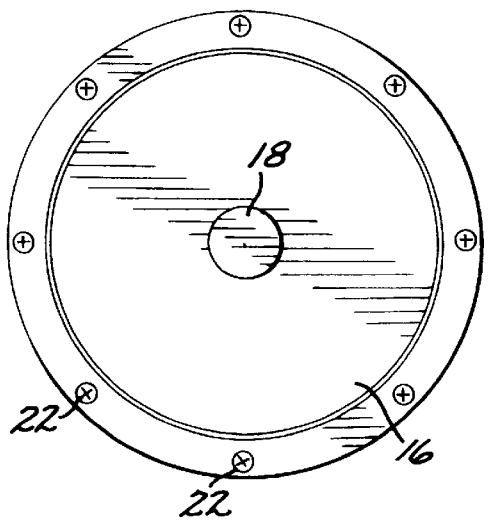
FIG. 4 is a bottom plan view of the device shown in FIG. 1.

Referring to FIGS. 1–4, different views of the transmission device 10 of the present invention is illustrated.

Device 10 comprises bearing hub 12, air inlet port 13, drive piston assembly 14, air inlet port 15, input hub 16, input power shaft 18 and output power shaft 20. Screws 22 join rigid lower disc 63 to ball retaining member 67 (see FIG. 6). Vibration control mounts 28 are secured to bearing hub 12; two radial bearings 30 (only one shown) support shaft 20.

Figure 5:
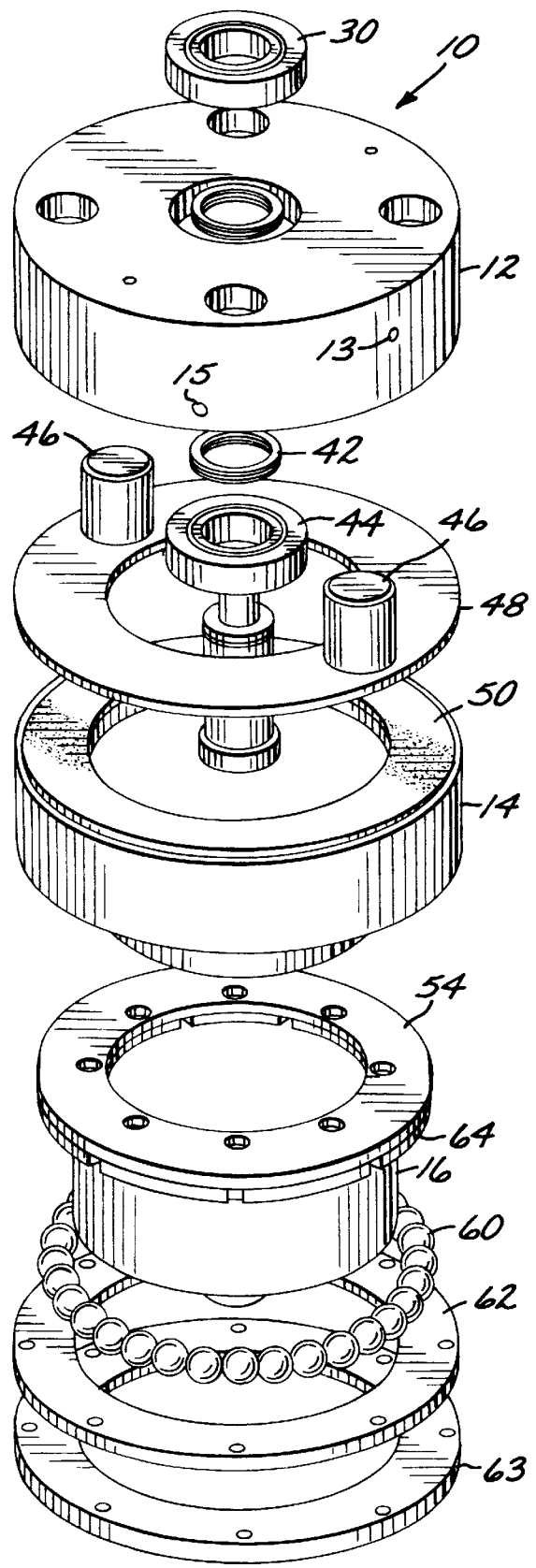
FIG. 5 is an exploded perspective view of the device shown in FIG. 1.

FIG. 5 is an exploded view of the device of the present invention. Device 10 comprises bearing and brake piston housing 12 having air torque input port 13 (a second such port is not shown) and braking input port 15 (a second such port is not shown) formed thereon, two bearing seals 42 (only one shown), bearings 44, brake pistons 46 (although only two pistons are illustrated in the figure, additional pistons could be utilized; the pistons are preferably positioned equidistant about the axis of device 10), stationary circular brake rotor 48, bonded brake disc 50, drive piston assembly 14, upper rigid disc 54, upper disc 56, cylinder body 16, balls 60, lower disc 62 and lower rigid disc 64. Discs 56 and 62 preferably are fabricated from soft, deformable material such as urethane; other materials which can be used include neoprene rubber, Buna-N rubber and silicone and in general, other materials which have a hardness in the range of 60–70 shore A. Balls 60 preferably are made of steel although most spherical objects which can withstand the load can be used, such as acrylic, copper and ceramic balls.

Figure 6:
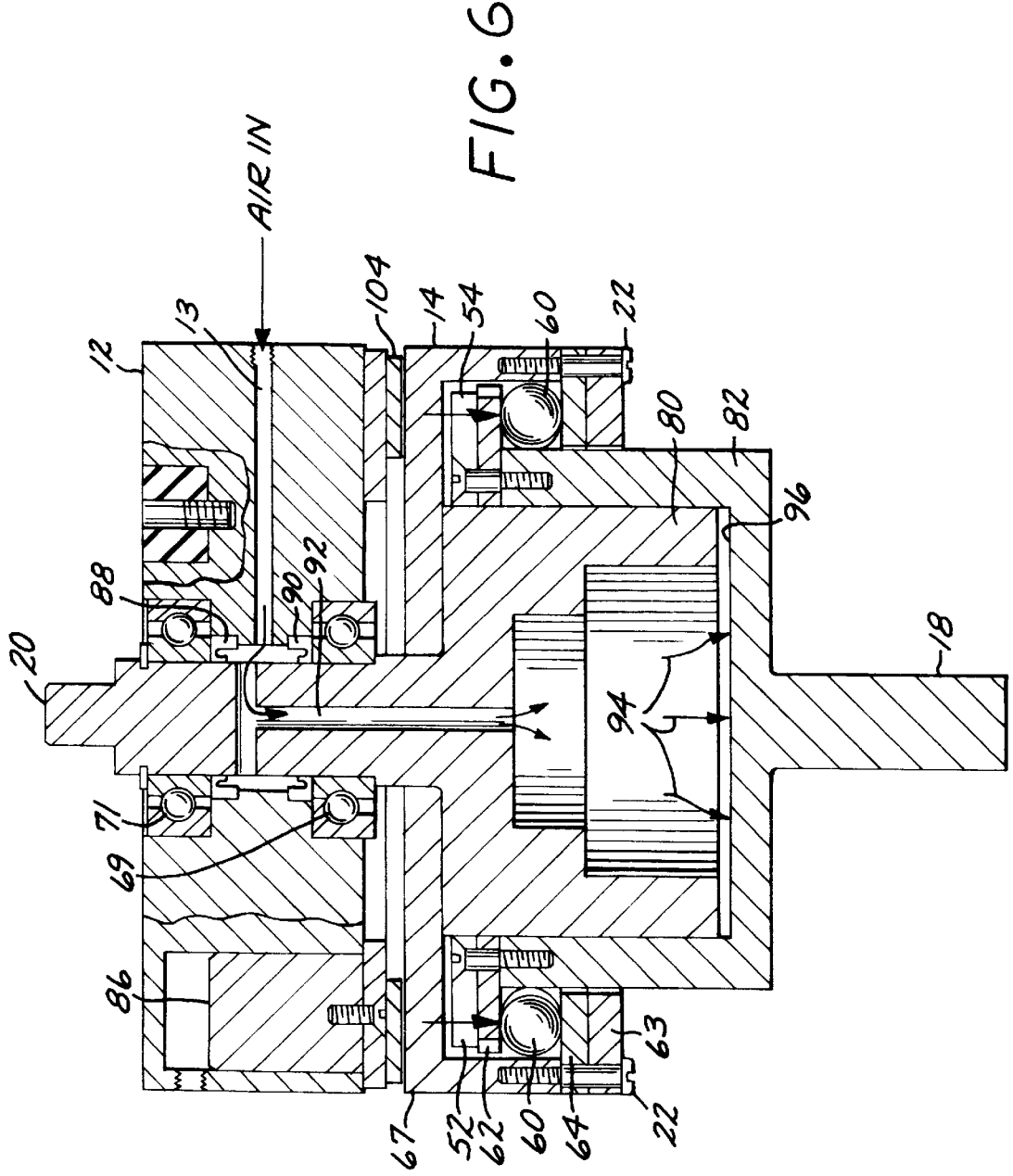
FIG. 6 is a cross-sectional view along line 6—6 of FIG. 2, illustrating the drive mode of operation.

FIG. 6 illustrates the clutch/brake in the drive (clutch) mode of operation. A plurality of rolling friction balls 60 are held circumferentially between two layers 62 and 64 made of resilient material, such as urethane, silicon or the like, and rigidly backed by two hard discs 54 and 63, respectively, by ball retaining member 67, member 67 entrapping the balls in a circular formation. The compressive force is obtained from a piston 80 and cylinder 82 arrangement which allows both axial and angular movements. Piston 80 supplies the driving force (ball compression) and is positioned about the longitudinal axis of the device. A regulated compressed air source (not shown) is connected to the ports 13 of the bearing housing 12 and entraps the pressure between two lip seals 88 and 90. Air then travels through the longitudinal hole 92 of the piston housing shaft and exits the bottom as illustrated by arrows 94. The air pressure is then applied against the internal surface 96 of the cylinder body, the resultant force causing the plurality of balls 60 to be uniformly compressed between the discs 62 and 64. Since the discs are fabricated from resilient, deformable material, the balls indent into the disc surface causing resistance to the tendency of the balls to roll and thus effectively controlling the output torque level. Any torque input from power input shaft 18 will be transferred to the output shaft 20 via this clutch/brake interface. Output shaft 20 rotates on radial ball bearing pairs 69 and 71. If the air pressure is changed, the amount of indention will increase or decrease, thus controlling the torque output. A typical range of air pressures and the corresponding output (drive) torque values are set forth in the table hereinbelow (braking values are similar).

| PRESSURE (psig) | TORQUE (in lb) |
| --- | --- |
| 10 | 20 |
| 20 | 30 |
| 40 | 50 |
| 60 | 75 |
| 80 | 100 |
| 100 | 125 |

Figure 7:
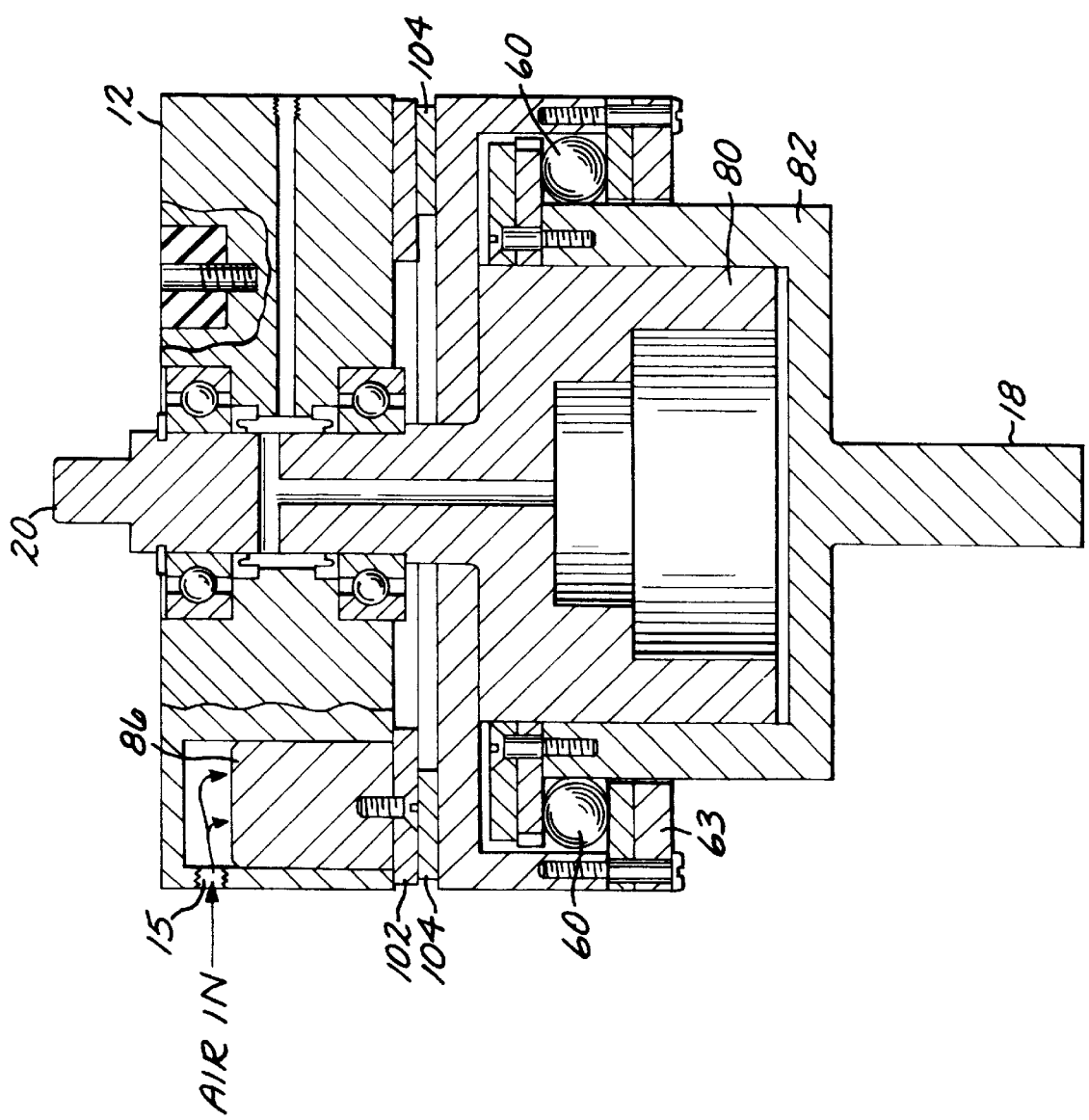
FIG. 7 is a cross-sectional view along line 6—6 of FIG. 2 illustrating the brake mode of operation.

FIG. 7 illustrates the brake mode of operation. Two pistons 86 (only one piston 86 is illustrated) are positioned 180 degrees apart as noted hereinabove. Pistons 86 provide the braking force and are radially positioned about the longitudinal center axis of the device. Note that pistons 86 are smaller than piston 80 (more than one of these pistons are required). Compressed air enters the bearing housing 84 through ports 15 and is entrapped inside the bore. The resultant pressure exerts a force on piston 80 and cause the stationary rotor 102 to be pressed against the circular frictional brake disc 104, disc 104 providing the stopping resistance when the device is in the brake mode. The air pressure is variable, thus providing the ability to adjust the braking torque. Breaking ceases when air pressure is no longer applied to the system 10.

The present invention thus provides a bi-directional torque limiting device utilizing air pressure in lieu of springs and centripetal force. The rolling friction based device reduces wear and tear on the clutch system and provides a relatively noise-free and responsive system. The system is inexpensive, reliable and has a relatively long life cycle.

While the embodiment has been described with a reference to its preferred embodiment, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. A controllable torque limiting device comprising:
   a housing;
   first and second ring members, said first and second ring members comprising deformable material;
   a plurality of ball members positioned between said first and second ring members;
   an input shaft;
   an output shaft, said input shaft in a first operating mode being coupled to said output shaft by said first and second ring members and said ball members;
   a first port formed in said housing;
   a piston member positioned within said housing; and
   channel members formed in said housing for directing air introduced to said port to said piston, the air pressure forcing said piston to move in an axial direction whereby said force is applied directly to said first ring member thereby causing said balls to deform into first and second surfaces of said first and second ring members whereby torque is transferred from said input shaft to said output shaft.

2. The device of claim 1 whereby the output torque is controlled by the air pressure introduced to said port.

3. The device of claim 1 wherein said first and second ring members are formed of urethane.

4. The device of claim 1 wherein first and second rigid disc members are positioned in contact with the second surface of said first and second ring members, respectively.

5. The device of claim 1 further including a second port formed in the wall of said housing.

6. The device of claim 5 further including a pair of spaced apart piston members positioned in said housing.

7. The device of claim 6 wherein compressed air is introduced though said second port within said housing, the resultant pressure exerting a force on said spaced apart pistons.

8. The device of claim 7 further including a stationary rotor member and a brake disc, said rotor member being pressed against said brake disc by the force on said pistons thereby braking said output shaft.

9. The device of claim 8 wherein the braking force is controlled by the pressure level of said compressed air.

10. A controllable torque transmission device comprising:
    an input shaft connected to a first stationary housing containing a first ring member made of deformable material;
    an output shaft connected to a second rotatable housing containing a second ring member made of deformable material;
    a plurality of spherical members positioned between the first and second deformable rings;
    a piston and cylinder system formed by the axial union of first and second housings;
    a first air port formed in said first stationary housing; and
    channel members formed in said first stationary housing for directing air to said piston and cylinder system, the resulting air pressure activating the piston and forcing it in an axial direction thereby moving said first ring member toward said second ring member, the piston motion deforming both first and second ring members around said spherical members, resulting in rolling friction that couples said input shaft to said output shaft.

11. The device of claim 10 whereby the coupling torque from the input to the output shafts is controlled by the air pressure applied to said first air input port.

12. The device of claim 10 wherein the said first and second ring members are made of material that can be deformed by the rolling motion of said spherical members with minimum wear or fatigue.

13. The device of claim 12 wherein said material comprises urethane.

14. A controllable torque transmission device having a braking mode of operation comprising:

an input shaft connected to a first stationary housing containing a first ring member made of deformable material;

an output shaft connected to a second rotatable housing containing a second ring member made of deformable material;

a plurality of spherical members positioned between the first and second deformable rings;

a piston and cylinder system formed by the axial union of first and second housings;

a first air input port formed in said first stationary housing;

channel members formed in first stationary housing for directing said air to said piston and cylinder system, the resulting air pressure activating the piston, forcing it in an axial direction thereby moving said first ring member toward said second ring member, said movement deforming both first and second ring members around said spherical members thereby coupling the torque applied to said input shaft to said output shaft by the rolling friction created by the deformation of said first and second ring members;

a first rigid disk member attached to said second rotatable housing; and a plurality of pistons/cylinder assemblies with a second air input port formed in said first stationary housing, the piston/cylinder assemblies positioned to exert an axial force against the said first rigid disk member moving it against said second rigid disk member, creating a friction braking force between said input shaft and said output shaft during said braking mode of operation.

15. The device of claim 14 whereby the braking force is controlled by the air pressure applied to said second air input port.

16. The device of claim 14 wherein said first rigid disk member is fabricated from steel and said second rigid disk member is fabricated from brake pad material.

17. A controllable torque transmission device comprising:

an input shaft connected to a first stationary housing containing a first ring member made of deformable material;

an output shaft connected to a second rotatable housing containing a disk shaped member made of rigid material;

a plurality of spherical members positioned between said ring member and said rigid disc shaped member;

a piston and cylinder system formed by the axial union of first and second housings;

a first air input port formed in said first stationary housing; and channel members formed in said first stationary housing for directing air to said piston and cylinder system, the resulting air pressure activating the piston and forcing it in an axial direction thereby moving said ring member toward said rigid disc shaped member, the piston motion deforming said ring member around said spherical members, resulting in rolling friction that couples said input shaft to said output shaft.

* * * * *